United States Patent [19]
Hehl

[11] Patent Number: 5,332,383
[45] Date of Patent: Jul. 26, 1994

[54] INJECTING UNIT FOR USE IN AN INJECTION MOLDING MACHINE

[76] Inventor: Karl Hehl, Arthur-Hehl-Str. 32, D-7298 Lossburg 1, Fed. Rep. of Germany

[21] Appl. No.: 989,539

[22] Filed: Dec. 11, 1992

[30] Foreign Application Priority Data

Dec. 24, 1991 [DE] Fed. Rep. of Germany ....... 4142928

[51] Int. Cl.$^5$ .............................................. B29C 45/17
[52] U.S. Cl. ................................ 425/190; 425/192 R; 425/574
[58] Field of Search ........... 425/182, 185, 190, 192 R, 425/574

[56] References Cited

U.S. PATENT DOCUMENTS

| | | | |
|---|---|---|---|
| 4,278,354 | 7/1981 | Hehl | 425/558 |
| 4,846,652 | 7/1989 | Hehl | 425/190 |

FOREIGN PATENT DOCUMENTS

| | | |
|---|---|---|
| 283582 | 9/1988 | European Pat. Off. |
| 314943 | 5/1989 | European Pat. Off. |
| 1094447 | 12/1960 | Fed. Rep. of Germany |
| 2450156 | 9/1980 | France |

Primary Examiner—Tim Heitbrink
Attorney, Agent, or Firm—Spencer, Frank & Schneider

[57] ABSTRACT

An injecting unit for use in an injection molding machine comprises an arrangement for locking an axially movable plasticizing cylinder to a carrying block and for locking a feed screw to a motor for rotating the feed screw, which is adapted to be coupled to the motor in that the feed screw is inserted into a profiled coupling section of the motor. The feed screw is axially displaceable for injecting the plastic material. The plasticizing cylinder is adapted to be locked at a stop of the carrying block by screw threads, which are provided on the plasticizing cylinder and are centered on the longitudinal axis of the cylinder, and a nut, which is screwed on the screw threads and rotatable by a drive engaging the periphery of the nut. When the plasticizing cylinder has thus been locked, the feed screw is locked to the feed screw motor. As a result, the plasticizing cylinder and the feed screw can reliably be locked and unlocked by simple arrangement, which can be automatically controlled.

20 Claims, 10 Drawing Sheets

INJECTING UNIT FOR USE IN AN INJECTION MOLDING MACHINE

BACKGROUND OF THE INVENTION

1. Field of the Invention

This invention relates to an injecting unit for an injection molding machine, which unit comprises a carrying block, an axially movable plasticizing cylinder, which has a longitudinal axis and is so mounted in said carrying block that said longitudinal axis constitutes an injecting axis of said injecting unit, a rotatable feed screw, and automatable means for locking said plasticizing cylinder to said carrier block and for locking said feed screw to a motor for rotating said feed screw, which is axially movable into coupling interengagement with a profiled coupling section of said motor and for ejecting plasticized plastic material out of said cylinder.

2. Description of the Prior Art

An injecting unit of that kind is disclosed in U.S. Pat. No. 4,846,652. In that known unit the means for locking he Plasticizing cylinder and the feed screw comprise two locking sliders, which are guided on the carrying block of the injecting unit and normally extend into recesses formed in the plasticizing cylinder to lock the same. Coupling bridges are connected to said sliders and serve to lock the feed screw. Locking and unlocking functions can be performed regardless of the operating condition of the injecting unit. In that design a reliable fixation of the plasticizing cylinder to the carrying block cannot be ensured unless the plasticizing cylinder is formed with recesses for receiving the slider. But such recesses reduce the wall thickness of the plasticizing cylinder in that region. Even the slightest deviation of the dimensions of the recesses from the specified dimensions may render the operation of the sliders more difficult so that an expensive machining of the surfaces of the recesses is required.

For a long time, e.g., from U.S. Pat. No. 4,278,354, it has been known to lock a plasticizing cylinder at a stop of the carrying block by means of a nut and to operatively connect the feed screw to a profiled coupling section of a motor for rotating said feed screw. But in that case the feed screw has not been locked in conjunction with the locking of the plasticizing cylinder and such locking means have not been automatable thus far. Problems arise also in connection with the release of the plasticizing cylinder when it has become stuck to the carrying block and can be detached therefrom only by an exertion of a strong force with a heavy tool, possibly by a blow delivered to the plasticizing cylinder by means of a tool.

SUMMARY OF THE INVENTION

In view of that prior art it is an object invention so to improve an injecting unit of the kind described first hereinbefore that the plasticizing cylinder and the feed screw can be locked and unlocked in the injecting unit reliably and in a simple manner and that said locking and unlocking operations can be automated.

That object is accomplished in that the plasticizing cylinder is adapted to be locked to the carrying block at a stop thereof by means of a screw-threaded joint, which is centered on the longitudinal axis of the plasticizing cylinder and comprises a nut, which is rotatable by drive means acting on the periphery of the nut, and means are provided for locking the feed screw to the associated motor in response to the locking of the plasticizing cylinder.

In such an injecting unit the plasticizing cylinder has screw threads having conventional dimensional tolerances so that the plasticizing cylinder can be made in a very simple manner and has no local portions reduced in wall thickness and its full wall thickness is available throughout the length of the cylinder and the latter is not formed with recesses giving rise to stress concentrations. It may even be possible to use a plasticizing cylinder having a smaller wall thickness so that the heat energy required to plasticize the plastic material can be adapted more quickly and more effectively to changing requirements.

In principle, that concept may also be adopted for existing injecting units, in which the plasticizing cylinder is merely screwed to the carrying block. When an injection molding machine comprising such a known injecting unit had been automated,, the user of the machine was required to adapt the existing plasticizing cylinders to the changed conditions. It is now possible to further use the existing plasticizing cylinders and even to use one and the same plasticizing cylinder in non-automated and automated machines at different times.

The provision of means for driving the nut permits a subsequent automation because the drive means may initially be designed only for a manual operation and may subsequently be replaced by a motor to permit an automation. For this reason it is possible to initially provide an injecting unit only with a simple screw-threaded joint, which may then be provided with a first module comprising manual drive means, which can be supplemented by a second module comprising drive means which can be automated. This means that the user can expand his locking and unlocking means by the provision of successive modules until fully automatic locking and unlocking means have been provided. Even when the plasticizing cylinder has become stuck to the carrying block it will be possible to loosen the nut even by a manually operated screw drive or a manually operated worm gear drive because strong forces can be exerted if the screw-threaded drive member has a suitable lead angle.

Just as in a modular system the plasticizing cylinder and the nut may interchangeably be used in different machines and the manufacturer may benefit from the advantage that the locking nut mounted at the rear end of the plasticizing cylinder has the same screw threads as the nut which is required to fix the injecting nozzle to the forward end of the plasticizing cylinder. Besides, the plasticizing cylinders can more easily be surface-hardened.

According to further features of the invention the drive means comprise a drive screw, which is axially movably mounted to be axially movable against the force of spring means, which are adapted to be compressed so as to lock the nut by a predetermined axial movement of the drive screw, or the drive screw may be vertical and together with an associated motors such as a hydraulic rotary motor, may constitute a unit, which is arranged to perform an axial movement in response to a compression of the spring means, which compression is damped by a damping member provided between two springs, and the operations by which the feed screw is locked to the associated motor, the feed screw is unlocked from the plasticizing cylinder and, if required, a rod for actuating a valve needle of an injection nozzle is coupled, are performed at the same time. In those cases the drive means are moved against the force of a spring, which remains in its position of rest until the nut has almost been tightened up. When in that case the force rises above the force of the spring or, in accordance with a further feature of the invention, to be set forth hereinafter, above the resistance presented by a friction pin,, an axial movement will be performed, which is utilized to unlock the feed screw from the plasticizing cylinder, to lock the feed screw to the associated motor and optionally to couple a rod for actuating a valve needle of an injection nozzle. That further feature resides in that the drive screw will axially be moved when the force is exceeded which is exerted by a spring on a friction pin and an actuating plate connected to the drive screw has overcome the resistance presented by a friction pin, which is transverse to the drive screw. For an unlocking movement the spring can assist the opening movement after the resistance of the friction pin has been overcome, and a pull-off action is obtained. The springs serve also to ensure that the mesh between the drive screw and the gear means on the periphery of the nut will be maintained even when such parts have become worn after they have been operated for a long time.

In accordance with further features at least one radially movable and rotatable locking slider is provided adjacent to the profiled coupling section of the motor for rotating the feed screw and a coupling bridge is provided for moving that locking slider to a locking position in response to the axial movement of the drive means. In that case, two radially displaceable locking sliders may be diametrically oppositely mounted in a guide member and are movable by springs into a radial recess of the feed screw and are movable out of their coupling position by a radially movable spreading wedge, which is operable by the coupling bridge. In that case the assembling is simple and nevertheless the axial locking of the feed screw to the profiled coupling section is ensured. Coupling is always effected against the force of the spring and the locking operation can be facilitated in that the coupling bridge is so designed that the sliders are controlled by pins, which can be moved out of engagement only in a predetermined position so that an inadvertent release of the connection will be avoided.

In accordance with a further feature of the invention a further locking slider is radially displaceably mounted on the plasticizing cylinder and in response to a downward movement of the drive screw is caused by a coupling bridge to axially and radially lock the feed screw in the plasticizing cylinder in that the slider is forced by a spring into a recess of the feed screw. In that case the feed screw will be locked in the plasticizing cylinder even during a handling of the plasticizing unit consisting of the plasticizing cylinder and the feed screw.

According to further features at least one locking pin is provided, which prevents an axial movement of the drive means unless the nut fully engages the carrying block. Besides, the axially movable locking pin is connected to the plasticizing cylinder by an interposed plate and the axial movement imparted to the plasticizing cylinder as the nut is tightened moves the locking pin out of its locking position by the interposed plate, which is provided between the coupling bridges, which are interconnected by pins, and the interposed plate is held by a spring in engagement with the rear end of the plasticizing cylinder. By said locking pin it is ensured that the locking of the feed screw and its axial movement cannot be performed unless the plasticizing cylinder has entirely been fixed to the carrying block.

Further desirable features will become apparent from the dependent claims.

DETAILED DESCRIPTION OF THE PREFERRED EMBODIMENT

An illustrative embodiment of the invention will now be described more in detail.

Figure 1:
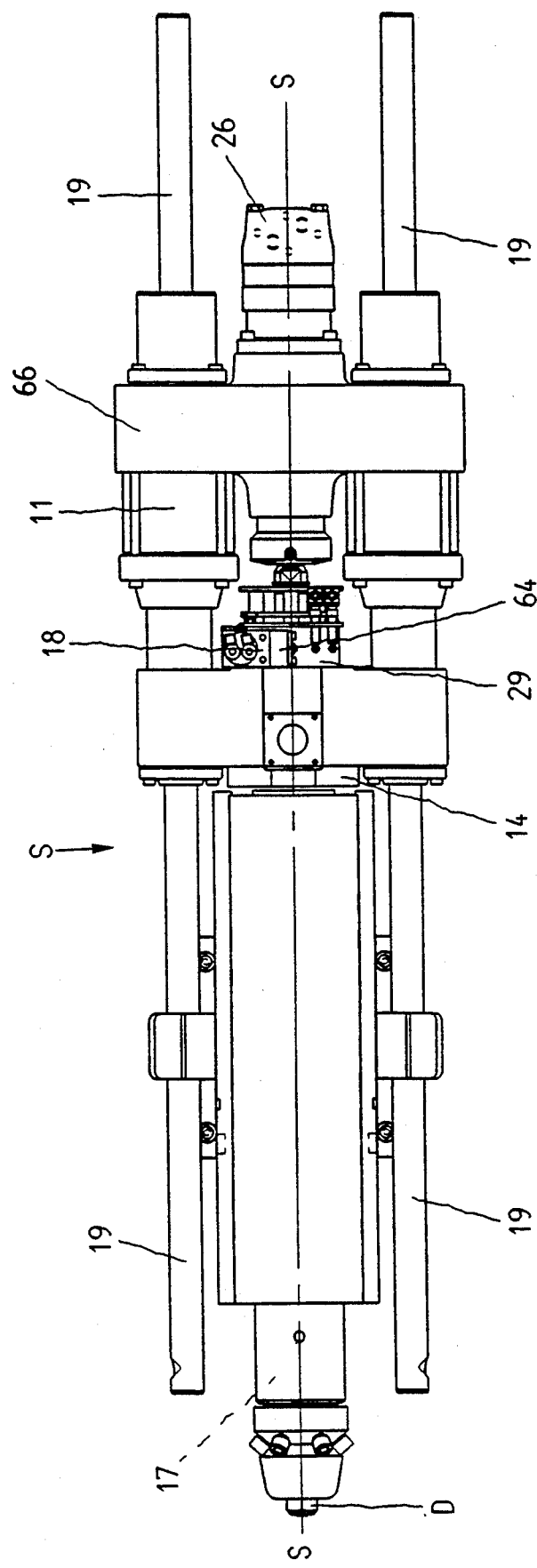
FIG. 1 is a top plan view showing an injecting unit embodying the invention with the plasticizing cylinder locked in position.
Figure 2:
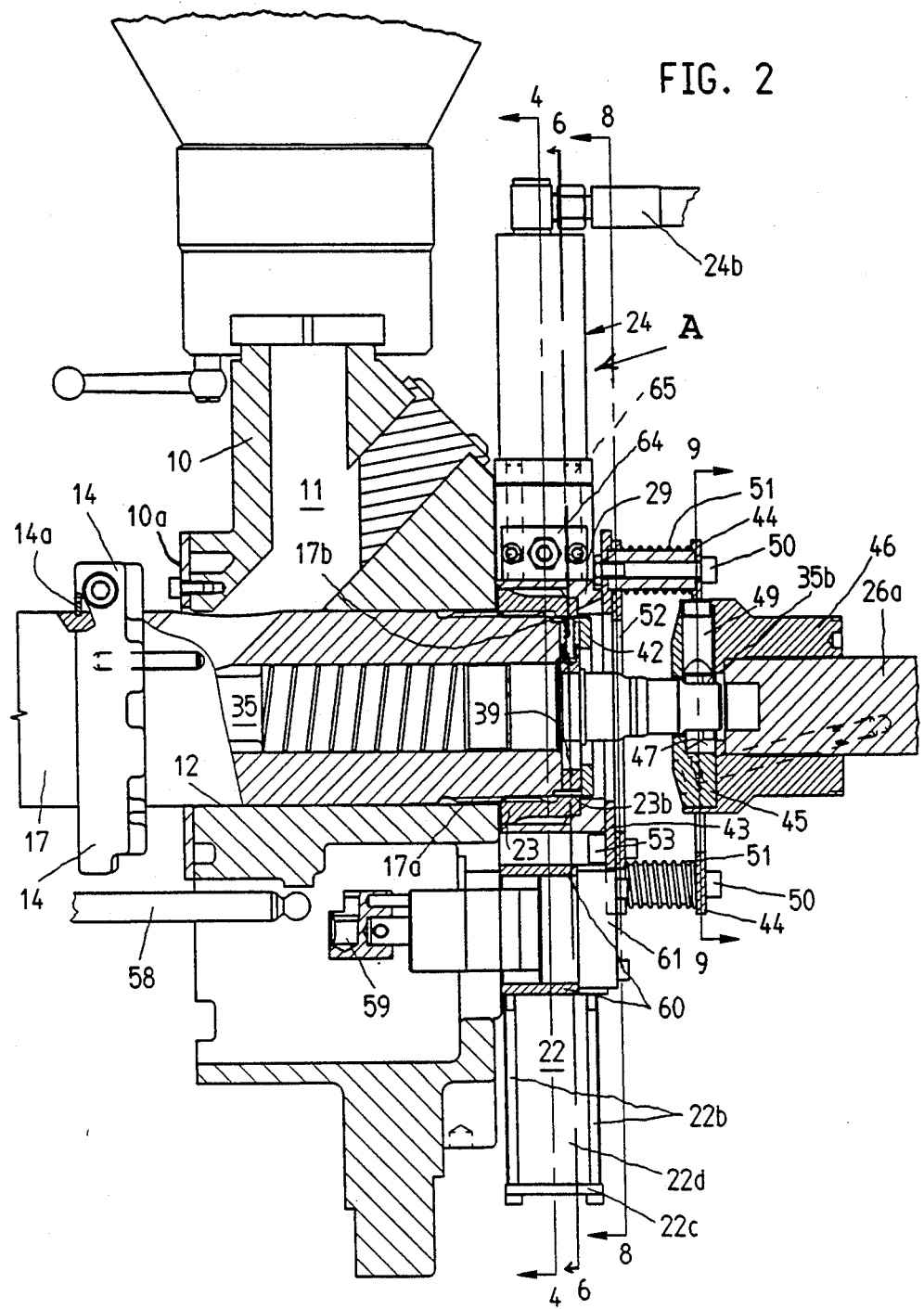
FIGS. 2 and 3 are enlarged fragmentary vertical sectional views taken on the injection axis s—s adjacent to the locking means and illustrating the positions after the locking movement and before it has been initiated.
Figure 3:
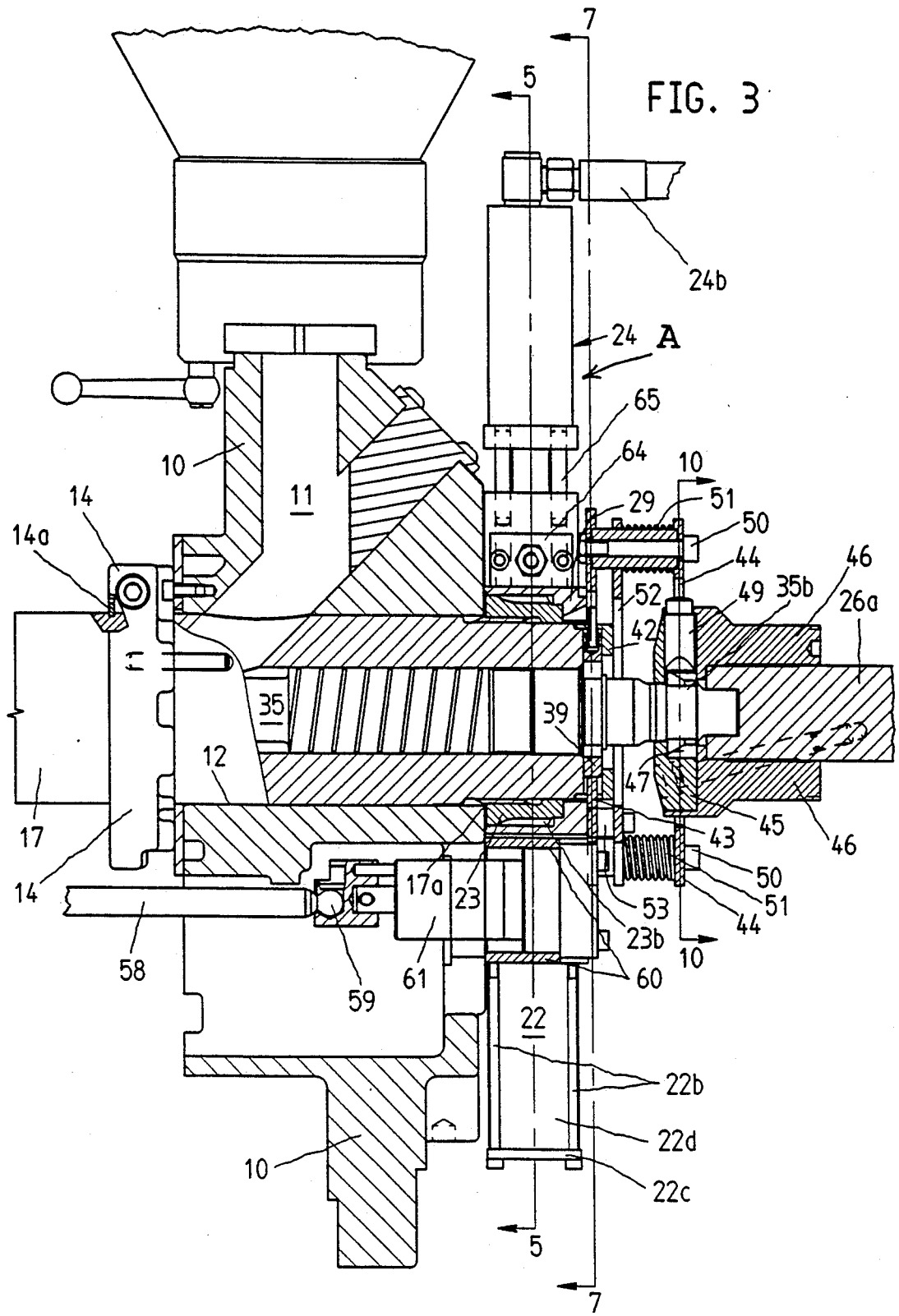
Figure 4:
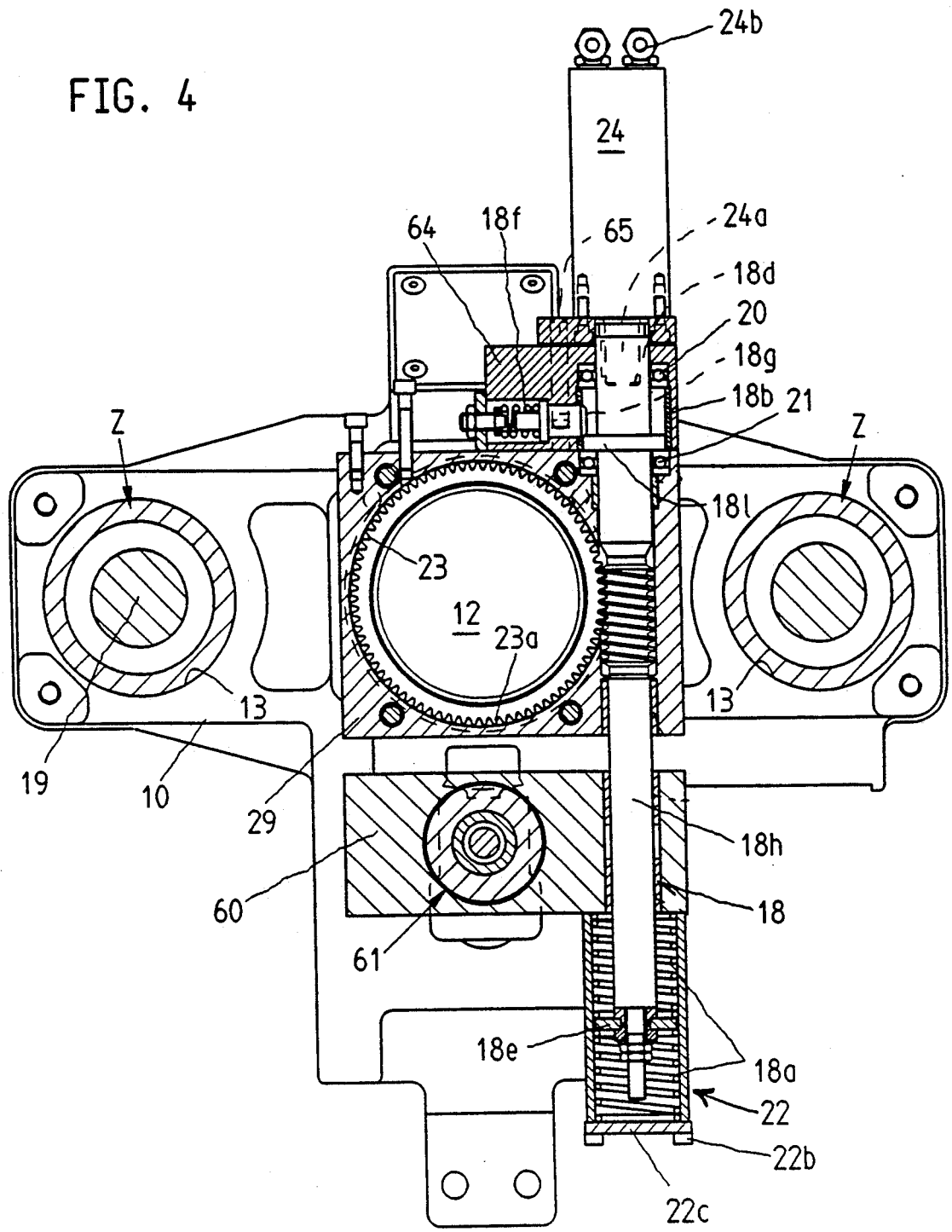
FIGS. 4 and 5 are vertical sectional views taken on line 4—4 in FIG. 2 and line in FIG. 3. respectively.

The injecting unit which is provided with the locking means comprises a carrying block 10, which receives the plasticizing cylinder 17 and is formed with feed passages 11 for the plastic material. As is apparent from FIGS. 4 and 5 in conjunction with FIG. 1, the carrying block 10 is formed with bores 13 for receiving hydraulic advance-retract cylinders Z. which are slidably mounted on guide rods 19 and operable to axially displace the injecting unit. The plasticizing cylinder is mounted in a central bore 12 of the carrying block 10 for an axial movement relative thereto. When the plasticizing cylinder 17 has been unlocked and has then axially been locked by a limited rearward movement imparted to the carrying block by a return stroke of the hydraulic cylinder Z, the plasticizing cylinder can be removed out of the central bore 12 of the block and carried away and be replaced by a different plasticizing cylinder.

The feed screw 35 is adapted to be connected to the associated motor 26 by means of a profiled coupling section 26a and is hydraulically displaceable by the cylinders Z and an injecting bridge 66 in order to inject the plastic material. To permit a locking action, the feed screw is provided with position control means, such as are apparent from U.S. Pat. No. 4,846,652, the disclosure of which is incorporated herein by reference. The position control means are adapted to effect a standstill of the feed screw motor 26 when the feed screw 35 is in a predetermined angular position. Hydraulic means or other means, such as electrically operated means, may be used to operate the injecting unit and its locking means.

The plasticizing cylinder 17 is adapted to be locked to the carrying block 10 by a screw-threaded joint. For that purpose the plasticizing cylinder 17 is provided with locking screw threads 17a, which are centered on the longitudinal axis s—s of the plasticizing cylinder, which is so mounted in the carrying block 10 that said longitudinal axis constitutes the injection axis of the injecting unit. When the plasticizing cylinder has been locked, the feed screw 35 is finally locked to the associated motor. The means for driving the locking means preferably comprise a screw drive 18 or a worm gear drive although any other suitable drive means may be employed, by which the nut can be driven at its periphery. The drive screw 18h of the screw drive 18 meshes with gear teeth 23a on the periphery of the nut 23 and is driven by a hydraulic rotary motor 24. But it will be understood that the drive screw may alternatively be driven by any other suitable drive means, such as electric or pneumatic or other drive means. The nut 23 has near its rear end a smooth surface 23b in sliding contact with an annular guiding surface 17b of the plasticizing cylinder.

Figure 5:
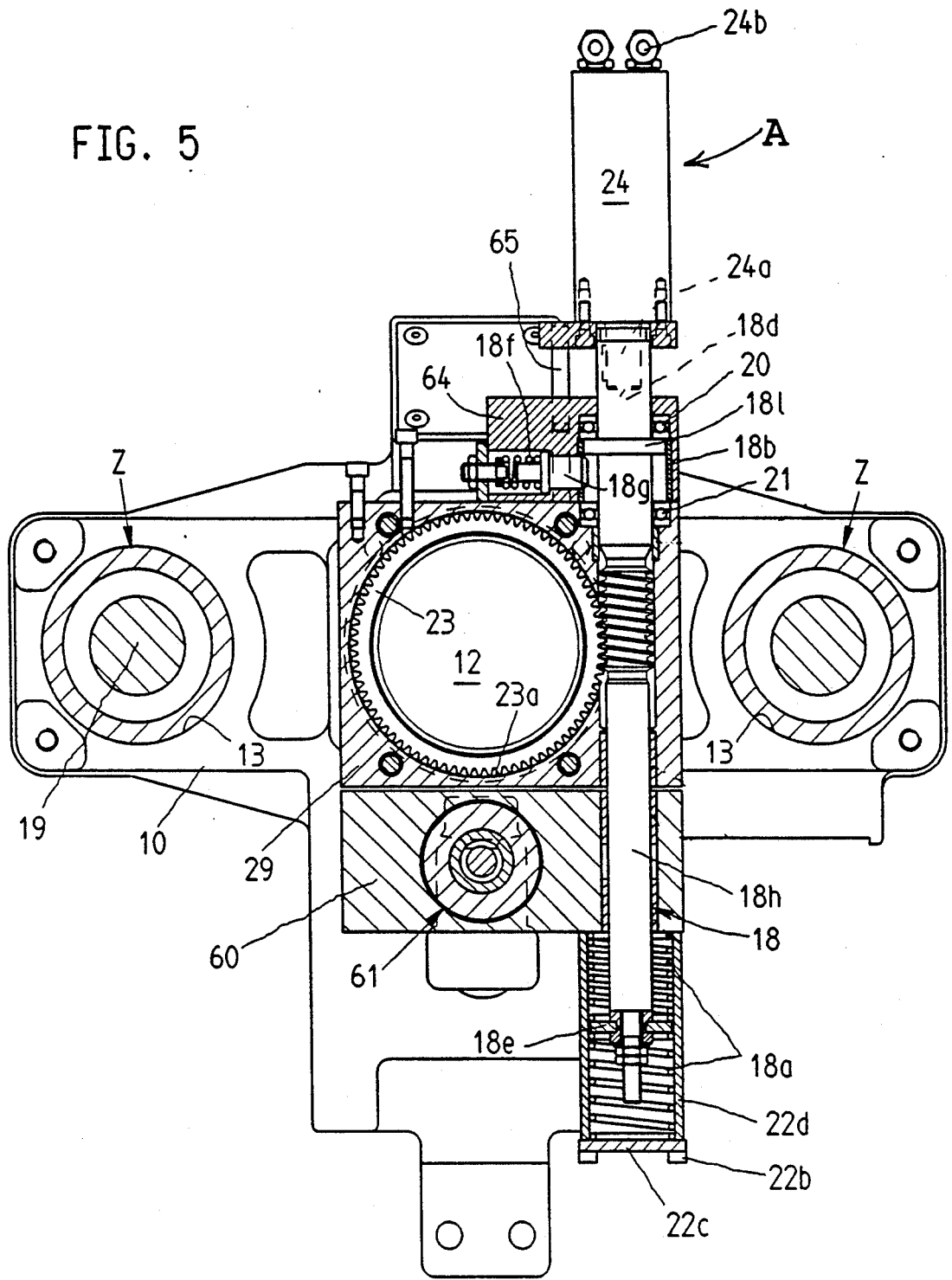
Figure 7:
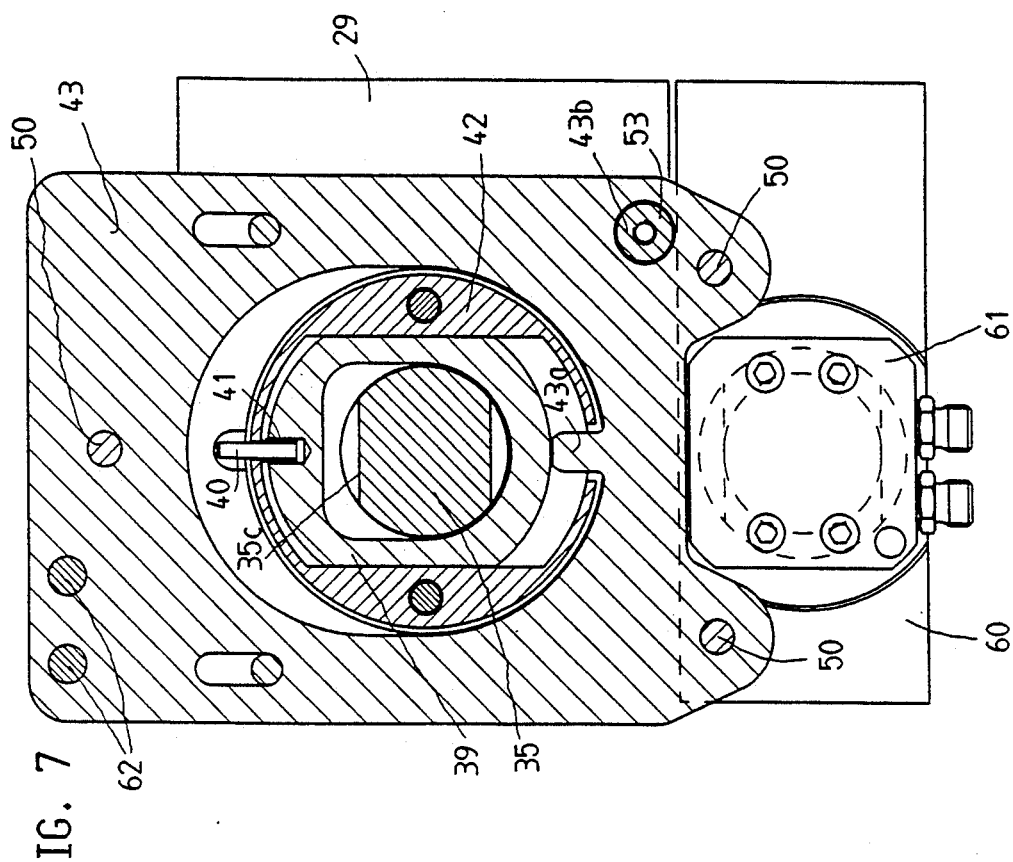
FIG. 7 is a vertical sectional view taken on line 7—7 in FIG. 3.
Figure 6:
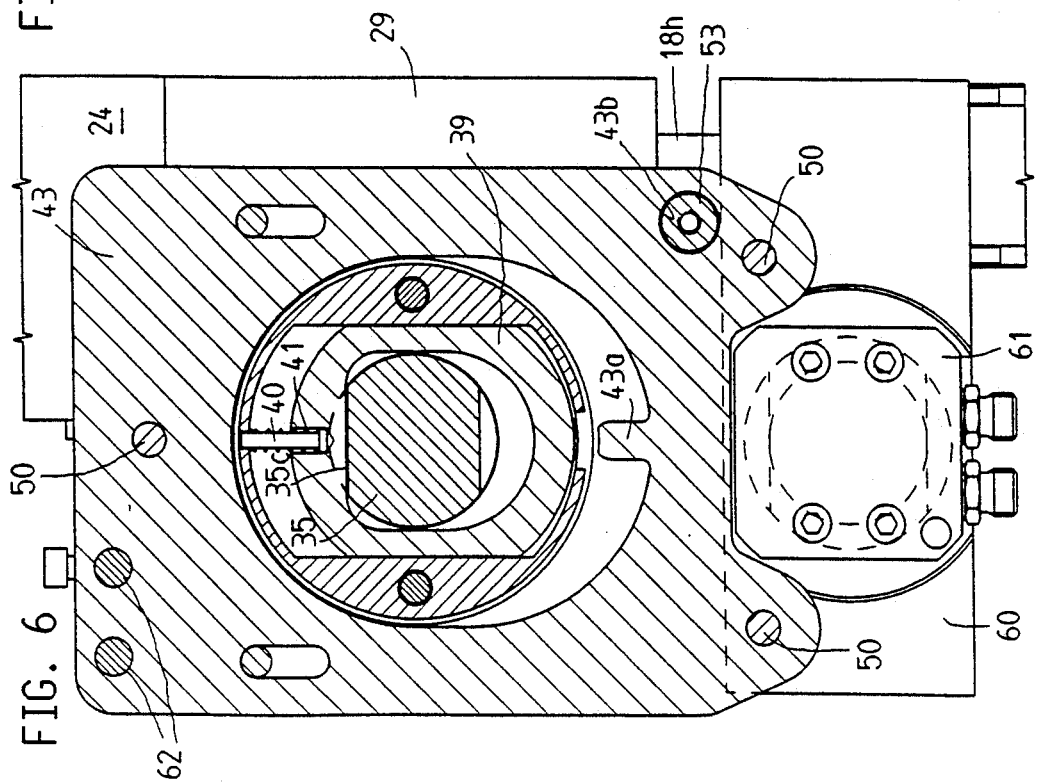
FIG. 6 is a vertical sectional view taken on line 6—6 in FIG. 2.

In addition to the drive screw the screw drive comprises two springs 18a, which surround the lower end portion of the drive screw 18h. That lower end portion is movably mounted between the springs in a damping plate so that the vertical movement of the drive screw will not damage other parts of the drive means or the nut. In order to prevent an axial movement of the drive screw until a certain force is exceeded, a housing 64 containing a friction pin 18g is provided above the housing 29 for the drive screw 18h. That friction pin 18g extends through and is a friction fit in the wall of a sleeve 18b, in which an abutment plate 18l is axially displaceably mounted. As is apparent from FIG. 4 the abutment plate 18l is disposed below the friction pin 18g before the nut has been tightened up. Owing to the resilient mounting by means of the spring 18f, which has been adjusted to exert a predetermined force on the friction pin 18g, the abutment plate 18l can force the friction pin 18g to the left in the drawings when the force of the spring 18f is overcome and the plate 18l will then be moved from the position shown in FIG. 4 to a position above the friction pin 18g, as is shown in FIG. 5. That arrangement will afford the advantage that predetermined forces will be required during the tightening and loosening of the nut before an axial movement is effected.

In that basic embodiment the locking means may also be manually operated if the cover 22c of the housing 22 for the screw drive 18 is formed with an opening, through which means for manually operating the drive screw 18h of the screw drive 18 can be inserted. The screw drive 18 described hereinbefore and the associated hydraulic rotary motor 24 constitute a first module, which may be automated at a later time, if desired, if the user when buying the injecting unit did not wish to incur the expenditure involved in fully automatic locking means. The drive screw 18h is mounted in bearings 20, 21.

The locking movement effects a locking of the nut 23 and results in an axial movement by which the feed screw is unlocked from the plasticizing cylinder and coupled to the rotating motor and, if desired, a rod 58 for actuating a valve needle of the injection nozzle D is coupled to means for operating said rod 58. The actuating rod 58 is coupled in that its spherical rear end is moved into a ball cage 59. The means for operating the valve needle comprise an actuating hydraulic cylinder 61, which is mounted in a cylinder holder 60 that is mounted in the housing 22 for the screw drive 18. The housing 22 comprises a steel sleeve 22d and the cover 22c. The parts of the housing 22 are secured to the cylinder holder 60 by screws 22b.

The drive screw 18h may be driven by a hydraulic rotary motor 24 or by a motor of a different kind. For that purpose the hydraulic motor 24 has a shaft 24a, which extends into a socket 18d of the drive screw 18h. The resulting drive unit A is axially movably mounted and the housing 64 for the hydraulic rotary motor is provided with means 65 for preventing a rotation of the motor 24 as a whole.

When the nut 23 has been rotated to displace the plasticizing cylinder and subsequently to initiate the locking operation of the locking means in the present embodiment, an abutment ring 14, which surrounds the plasticizing cylinder 17 and is fixed thereto by a retaining ring 14a, is caused to engage a stop surface 10a of the carrying block 10 on that side which is remote from the nut 23. In principle, however, that pulling movement may be replaced by a pushing movement and a stop may then be provided on the other side of the carrying block 10.

To permit an initiation of the locking movement, the screw threads 17a of the plasticizing cylinder 17 must be able to interact with the nut 23. For that purpose the entire injecting unit is advanced to a position defined by detent means and the plasticizing cylinder is then held in position so that a continuation of that movement by the carrying block will result in a relative movement between that carrying block 10 and the plasticizing cylinder, which is relatively axially movably mounted in the central bore 12 of the carrying block. That relative movement results in the application of the contact pressure which is required to initiate the engagement of the screw threads 17a with the nut 23. In principle, that contact pressure may alternatively be applied by other means, such as suitably arranged springs.

Hereinafter the parts connected to the screw drive or worm gear drive will be described more in detail with reference to FIGS. 3 and 6 to 13. The screw drive is connected to coupling bridges 43 and 44 for driving various locking sliders. The coupling bridge 44 serves to operate two radially guided locking sliders 47, which are arranged to rotate in unison with the feed screw 35. As is apparent from FIGS. 9 to 13 the locking sliders 47 are diametrically arranged with respect to the injection axis s—s and are guided around guiding surfaces 45c of the guide member 45. The radially displaceable locking sliders 47 are movable by springs 48, placed in bores 47a into a radial recess 35b of the feed screw 35 to axially lock the latter. At the same time the rear end of the feed screw is moved into another radial coupling. The guide member 45 is formed with a recess 45d for receiving a spreading wedge 49, which at one end is actuated by the coupling bridge 44 and by its conical other end spreads the two locking sliders 47 apart to unlock the feed screw 35. The guide member 45 is mounted in a holder 46.

Figure 11:
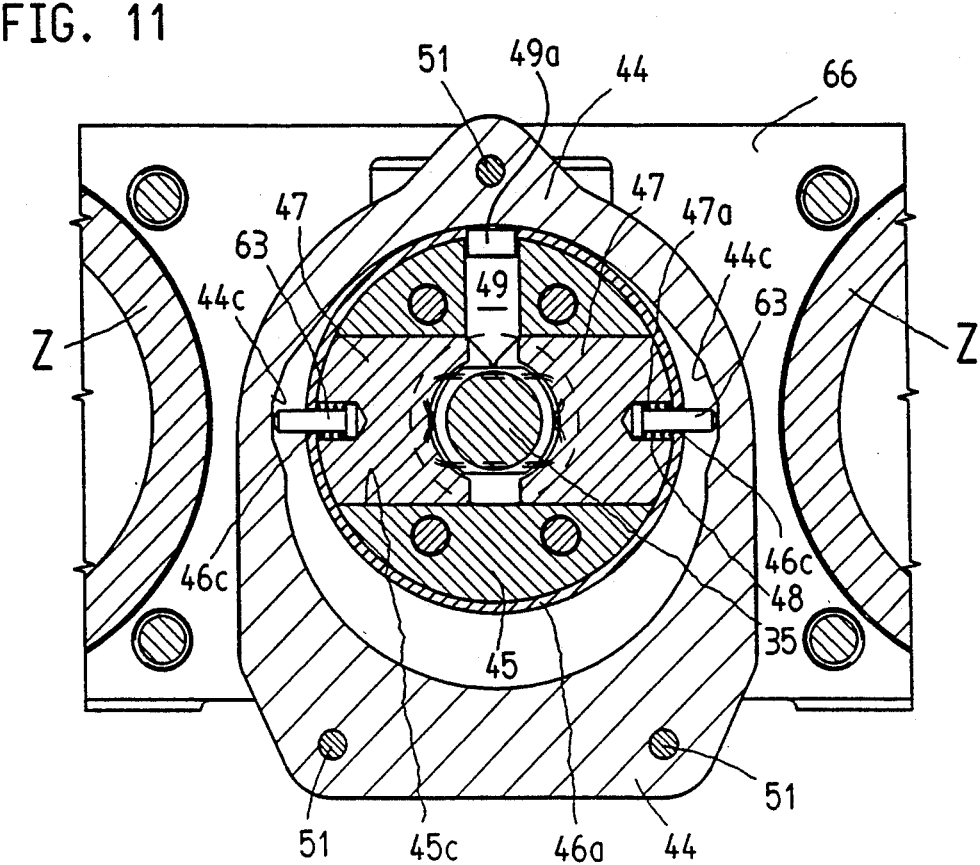
FIGS. 11 and 12 are views which are similar to FIGS. 9 and 10 and show locking pins for operating the locking sliders.
Figure 12:
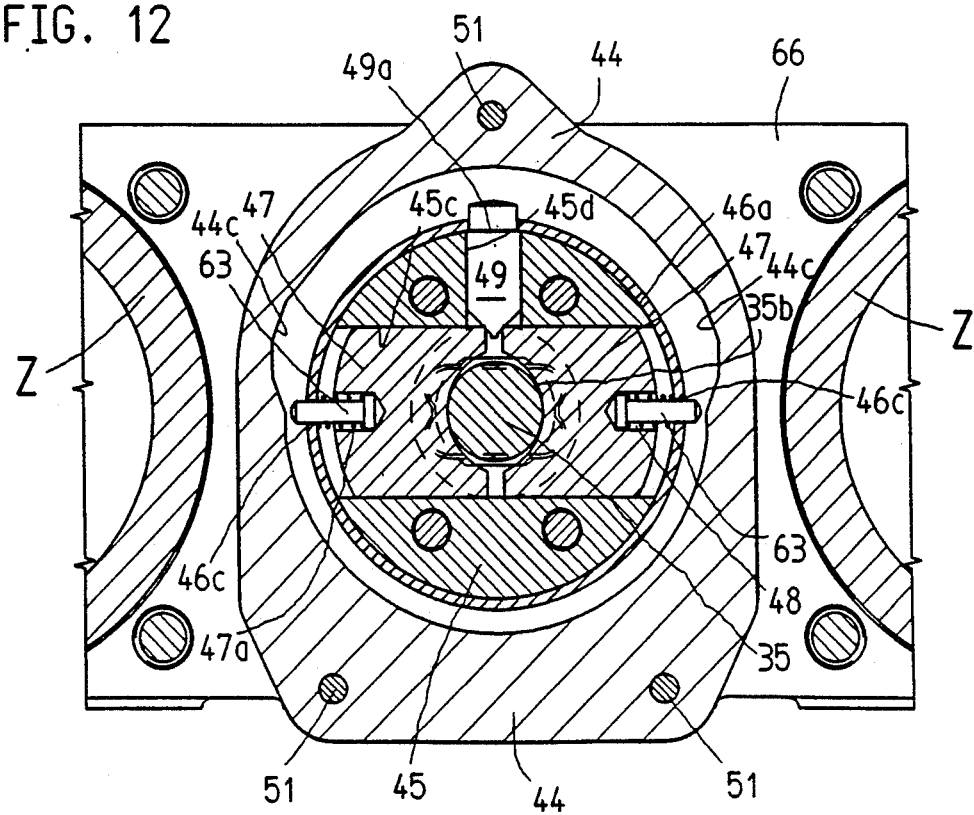
Figure 13:
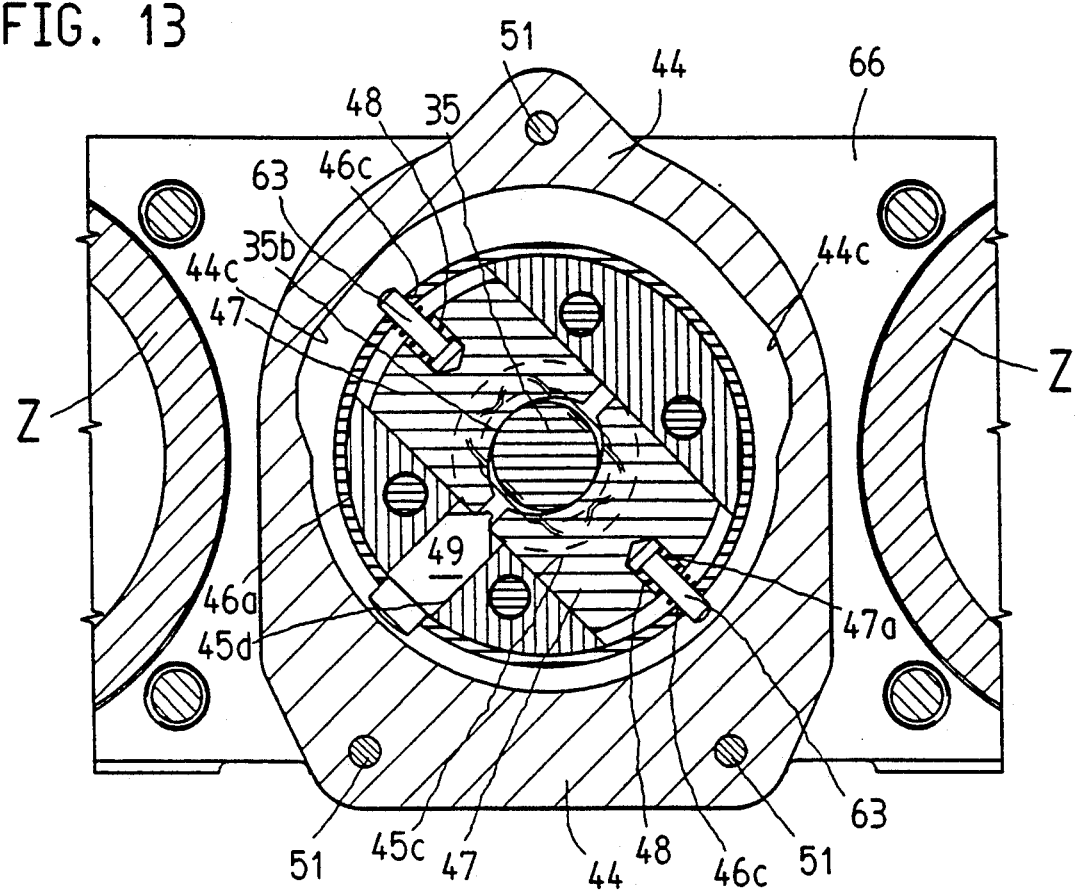
FIG. 13 is a view that is similar to FIG. 12 and shows the sliders in positions rotated through 45°.

FIGS. 11 to 13 illustrate another embodiment of the means for locking the feed screw. In that embodiment the locking sliders are actuated by locking pins 63, which extend through an opening 46c in the wall 46a of the holder 46 and can be moved out of engagement only when they are in a predetermined position in recesses 44c of the coupling bridge 44, as is particularly apparent from FIG. 11. During the remaining part of each revolution they are guided by guiding edges 44b of the coupling bridge 44 so that they are reliably As is particularly apparent from FIG. 13 the locking pins are guided on said guiding edges and the spreading wedge 49 urged outwardly by centrifugal forces is restrained.

For a locking of the feed screw 35 to the plasticizing cylinder 17 the locking means comprise additional locking members, which serve to axially locate the feed screw in the plasticizing cylinder, particularly when it is being handled outside the injecting unit.

For that purpose a further locking slider 39 is mounted for a limited radial displacement in a guiding groove at the rear end of the plasticizing cylinder 17 and under the action of a spring 41 enters a registering recess 35c of the feed screw 35. The guiding groove is covered by a cover 42, which covers the rear end of the plasticizing cylinder 17. The locking slider 39 is actuated by the further coupling bridge 43 on two sides and is held in its locking position by the action of the spring 41, which consists of a coil spring abutting on the cover 42. The spring 41 surrounds a pin 40, which is received in a blind bore of the further locking slider 39. The locking slider 39 is adapted to be actuated on the other side by means of a nose 43a of the coupling bridge 43.

Figure 8:
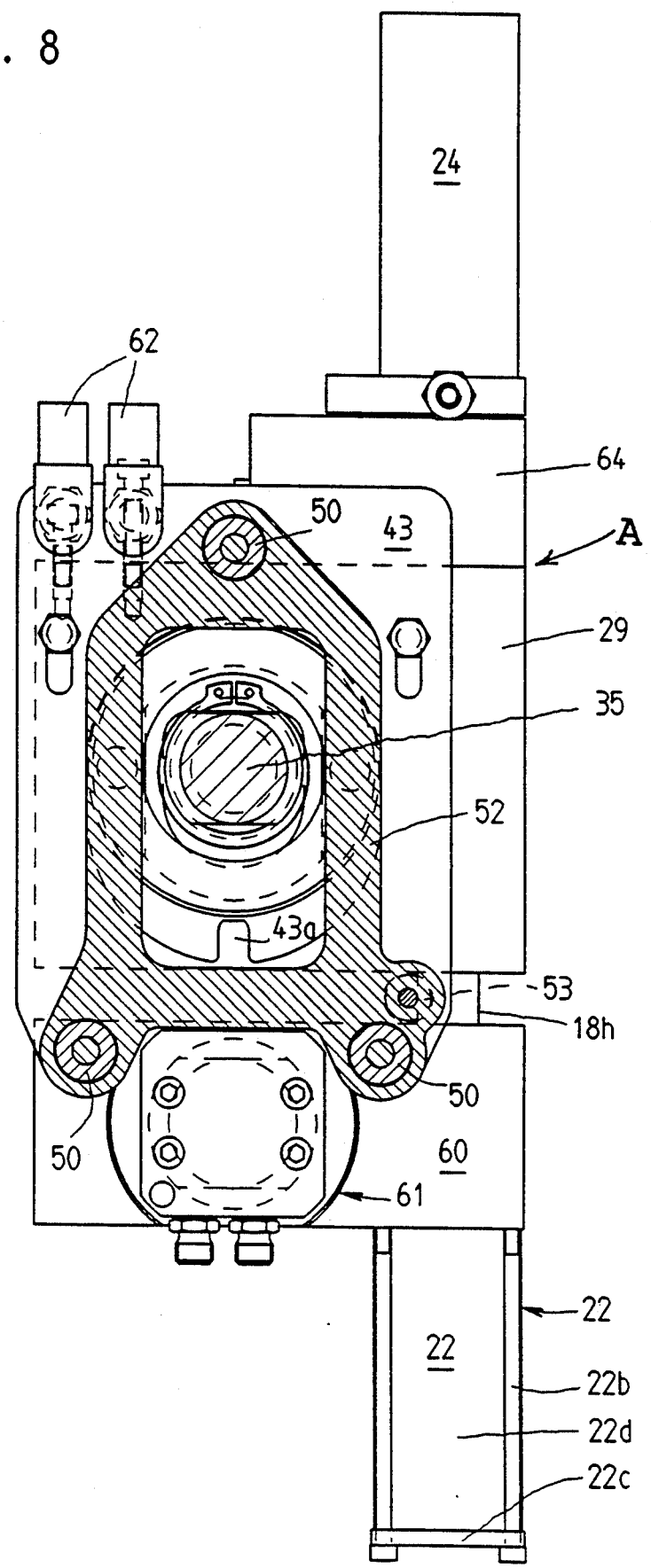
FIG. 8 is a vertical sectional view taken on line 8—8 in FIG. 2.
Figure 9:
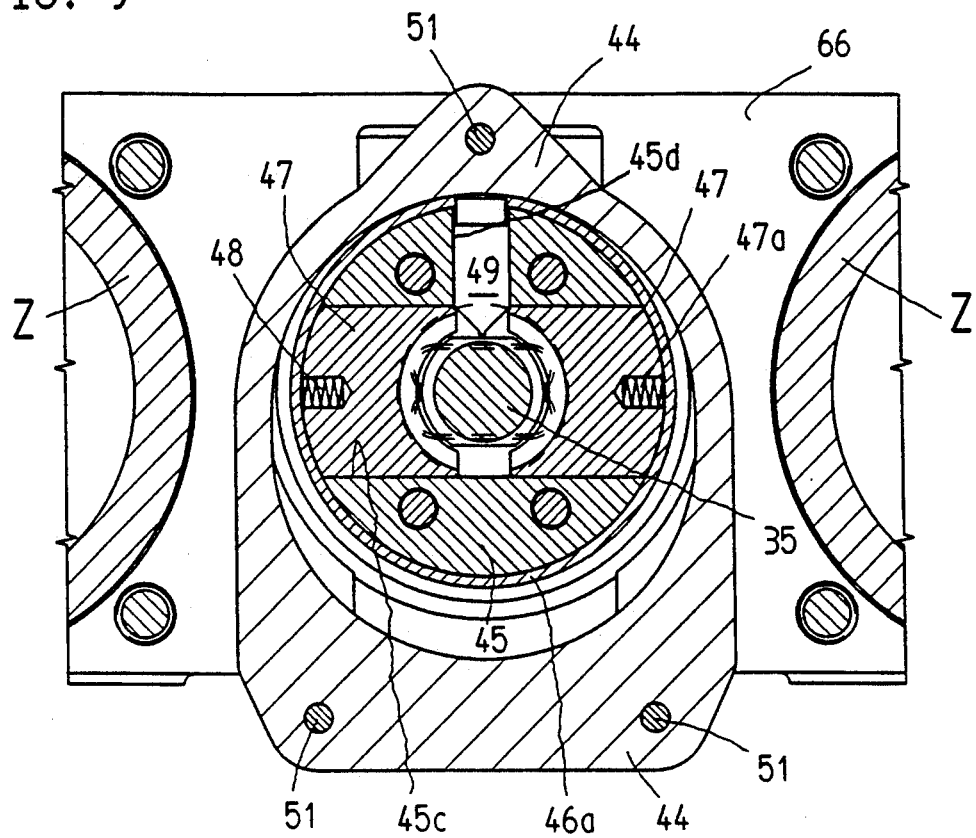
FIGS. 9 and 10 are vertical sectional views taken on line 9—9 in FIG. 2 and line 10—10 in FIG. 3. respectively.
Figure 10:
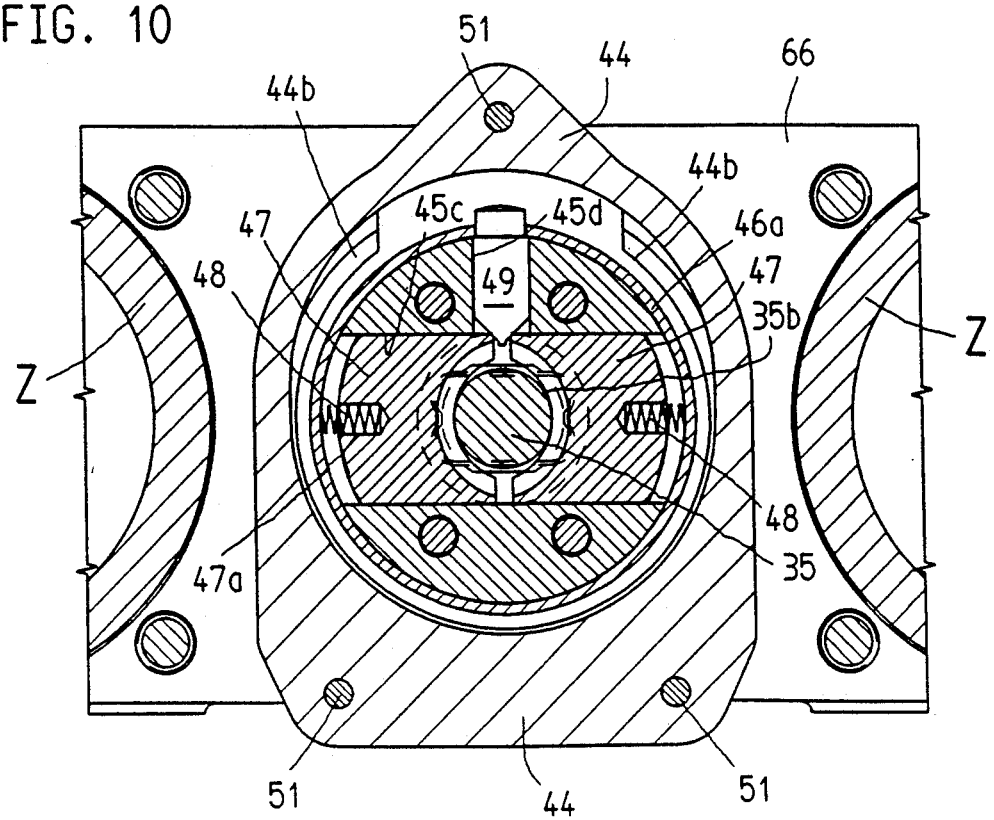

The coupling bridges 43 and 44 are interconnected by pins 50, to which an interposed plate 52 is also secured. Locking pins 53, traversing the coupling bridge 43 through openings 43b, are secured to the interposed plate 52 and prevent an axial movement of the drive means until the nut has fully engaged the carrying block. As the nut is tightened, the rear end of the plasticizing cylinder 17 emerges from the carrying block and thus forces the interposed plate 52 away from the coupling bridge 43 (FIG. 8). At that time the interposed plate 52 is held by springs 51 against the rear end of the plasticizing cylinder. As soon as the locking pins protrude from the rear of the coupling bridge 43, the axial movement can be performed and the locking and unlocking movements described hereinbefore may be performed.

When the locking operations have been performed, signal switches 62 deliver to the control means of the injection molding machine a signal which can electronically be processed. The hydraulic rotary motor has hydraulic ports 24b. The friction pin 18g extends at right angles to the axis of the drive screw 18h. The illustrated hydraulic cylinders Z consist of pairs of nested advance-retract and injecting cylinders, and the injecting cylinders are interconnected by an injecting bridge 66.

I claim:

1. In an injecting unit for use in an injection molding machine, which unit comprises
   a carrying block,
   a plasticizing cylinder, which has a longitudinal axis and is axially movably mounted in said carrying block,
   a rotary feed screw motor having a rotatable profiled coupling section,
   a feed screw, which is rotatably mounted in said plasticizing cylinder and is axially movable relative to said plasticizing cylinder and is adapted to be relatively non-rotatably coupled to said profiled coupling section, and
   locking means for locking said plasticizing cylinder to said carrying block and for locking said feed screw in a coupling position to said profiled coupling section,
   the improvement residing in that said locking means comprise
   a stop, which is provided on said carrying block and axially faces said plasticizing cylinder,
   screw threads, which are formed on said plasticizing cylinder and are centered on said longitudinal axis,
   a nut, which is screwed on said screw threads and is rotatable in sliding engagement with said carrying block to axially move said plasticizing cylinder to said carrying block and has a periphery formed with engageable parts,
   drive means, engaging said engageable parts and operable to rotate said nut, and
   means for axially locking said feed screw in said coupling position to said profiled coupling section when said plasticizing cylinder has thus been locked to said carrying block.

2. The injecting unit as set forth in claim 1 as applied to an injecting unit comprising hydraulic cylinders for axially moving said feed screw to and from said coupling position, wherein
   said locking means comprise means for locking said feed screw in said coupling position to said profiled coupling section when said plasticizing cylinder has thus been locked to said carrying block and
   means are provided for unlocking said feed screw from said plasticizing cylinder when said plasticizing cylinder has thus been locked to said carrying block.

3. The injecting unit as set forth in claim 1, wherein
   said engageable parts comprise gear means for engagement by said drive means,
   said drive means comprise a screw-threaded drive member meshing with said gear means and rotatable to rotate said nut on said screw threads so that said nut is axially moved relative to said plasticizing cylinder.

4. The injecting unit as set forth in claim 3, wherein said drive means comprise a motor for rotating said screw-threaded member.

5. The injecting unit as set forth in claim 3, wherein said gear means comprise a spur gear and
   said screw-threaded member comprises a drive screw.

6. The injecting unit as set forth in claim 3, wherein said gear means comprise a worm wheel and
   said screw-threaded drive member comprise a worm.

7. The injecting unit as set forth in claim 3, wherein said drive means comprise an abutment and spring means disposed between said abutment and said screw-threaded drive member, which is mounted to be axially movable relative to said abutment and to be biased by said spring means with an increasing force as said nut is tightened further when said plasticizing cylinder engages said stop and to compress said spring means so as to prevent a further tightening of said nut when said biasing force exceeds a predetermined value.

8. The injecting unit as set forth in claim 7, as applied to an injecting unit comprising hydraulic cylinders for axially moving said feed screw to and from said coupling position, wherein
   said locking means comprise means for locking said feed screw in said coupling position to said profiled coupling section when said biasing force exceeds said predetermined value and means are provided for unlocking said feed screw from said plasticizing cylinder when said plasticizing cylinder has thus been locked to said carrying block.

9. The injecting unit as set forth in claim 8, as applied to an injecting unit comprising an injecting nozzle, a valve needle for controlling said injecting nozzle, an actuating rod for actuating said actuating rod, and actuating means for actuating said actuating rod, wherein
said locking means comprise means for coupling said actuating rod to said actuating means when said biasing force exceeds said predetermined value.

10. The injecting unit as set forth in claim 8, wherein said means for axially locking said feed screw to said plasticizing cylinder comprise a locking slider, which is radially movably mounted in said plasticizing cylinder and is connected to said screw-threaded drive member,
said feed screw is formed with a recess, and
said screw-locking slider is biased by spring means for urging said spring screw-locking slider into said recess so as to axially and radially lock said feed screw to said plasticizing cylinder when said screw-threaded drive member has been moved by said spring means to a position in which said locking slider registers with said recess.

11. The injecting unit as set forth in claim 7, wherein said drive means comprise a motor for rotating said screw-threaded drive member,
said screw-threaded drive member extends at right angles to said longitudinal axis of said plasticizing cylinder and together with said motor constitutes a unit, which is movable along the axis of said screw-threaded drive member, and
said spring means are provided between said unit and said abutment and comprise two springs and a damping element movable mounted between said springs and arranged to restrain the compressing of said springs by said unit.

12. The injecting unit as set forth in claim 9, wherein said motor is a hydraulic rotary motor.

13. The injecting unit as set forth in claim 7, wherein said spring abutment is mounted to be axially movable along the axis of said spring screw-threaded drive member and
a spring-biased restraining pin extending at right angles to said screw-threaded drive member is arranged to restrain said spring abutment against an axial movement under the force of said spring means unless said biasing force exceeds said predetermined value.

14. The injecting unit as set forth in claim 7, wherein said locking means comprise radially guided, rotatably mounted locking slider means, which are disposed adjacent to said profiled coupling section and are coupled to said abutment by a coupling bridge arranged to move said locking slider means to a position for locking said feed screw in said coupling position to said profiled coupling section in response to said axial movement of said screw-threaded drive member.

15. The injecting unit as set forth in claim 14, wherein
said locking slider means comprise two locking sliders, which are diametrically arranged and radially displaceable in a guide member,
said feed screw is formed on the outside with a radial recess,
said locking sliders are biased by spring means to enter said recess when said feed screw is in said coupling position, and
a radially guided spreading wedge is provided, which is operable by said coupling bridge to engage said locking sliders and so as to move them out of said recess.

16. The injecting unit as set forth in claim 14, wherein
said coupling bridge is coupled to said locking slider means by locking pins, which extend through a wall of a holder and are arranged to be guided along guiding edges of said coupling bridge over a major part of each revolution imparted to said feed screw by said feed screw motor when said feed screw is locked to said profiled coupling section, and
said coupling bridge is formed with recesses for receiving said locking pins so as to unlock said feed screw.

17. The injecting unit as set forth in claim 1, wherein
said nut and said stop are provided on opposite sides of said carrying block,
said plasticizing cylinder comprises a shell surrounded by an abutment ring facing said stop, and
said abutment ring is secured to said plasticizing cylinder by a retaining ring, which extends only slightly into said shell.

18. The injecting unit as set forth in claim 1, wherein said locking means comprise at least one locking pin for preventing an axial movement of said drive means unless said nut has been screwed into engagement with said carrying block.

19. The injecting unit as set forth in claim 18, wherein
said plasticizing cylinder has a rear end,
said locking pin is axially movable and is connected to said plasticizing cylinder by an interposed plate,
said locking pin is arranged to be moved from its locking position by said interposed plate as said nut is rotated in sliding engagement with said carrying block to impart an axial movement to said plasticizing cylinder,
said locking means comprise two coupling bridges, which are interconnected by pins,
said interposed plate is provided between said coupling bridges, and
spring means are provided, which urge said interposed plate against said rear end of said plasticizing cylinder.

20. The injecting unit as set forth in claim 1, wherein means are provided for automatically controlling said drive means.

* * * * *